Aug. 23, 1927.

T. H. OPPENHEIM ET AL 1,639,808

CONVEYER

Original Filed Nov. 29, 1924   2 Sheets-Sheet 1

Inventor

T. H. Oppenheim
B. Selhorst

By Lacey & Lacey, Attorneys

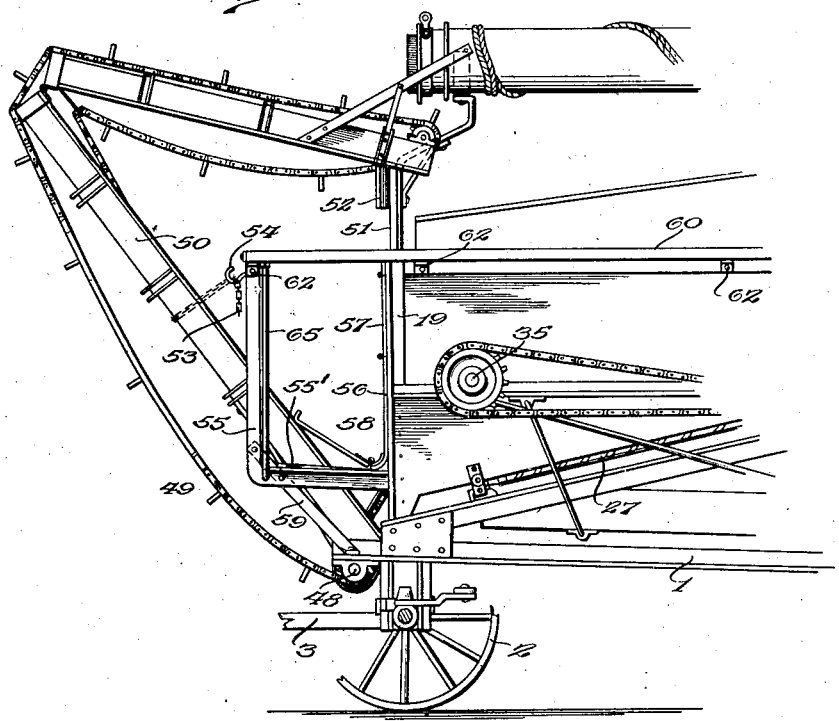
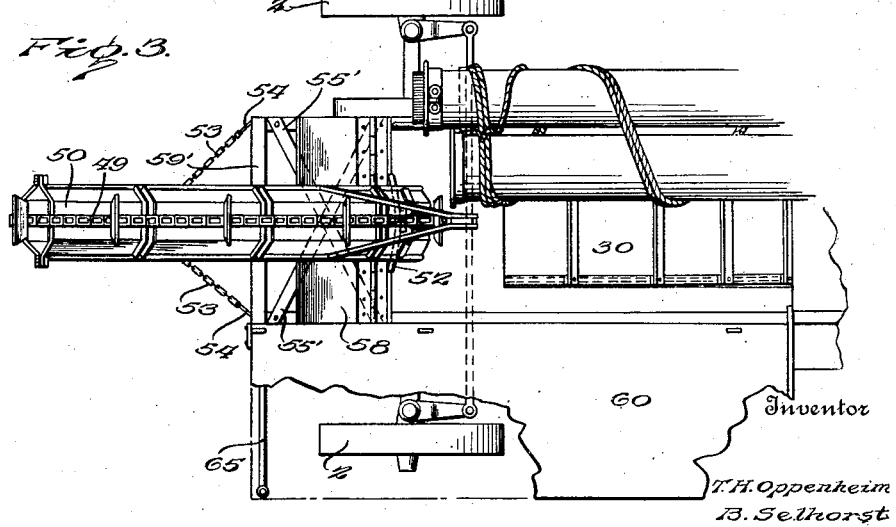

Patented Aug. 23, 1927.

1,639,808

UNITED STATES PATENT OFFICE.

THEODORE H. OPPENHEIM AND BERNARD SELHORST, OF COLDWATER, OHIO, ASSIGNORS TO NEW IDEA SPREADER CO., OF COLDWATER, OHIO, A CORPORATION OF OHIO.

CONVEYER.

Original application filed November 29, 1924, Serial No. 753,007. Divided and this application filed April 13, 1926. Serial No. 101,795.

This invention relates to conveyers for removing husked ears of corn from corn-husking machines, the present application being a division of an application filed by us November 29, 1924, Serial No. 753,007. The invention is illustrated in the accompanying drawings and will be hereinafter fully set forth, the novel features being particularly defined in the appended claims.

In the drawings:

Fig. 2 is a similar view showing the opposite side of the machine, the conveyer being in folded inoperative position, and Fig. 3 is a plan view with the parts in the positions shown in Fig. 2.

Figure 1:
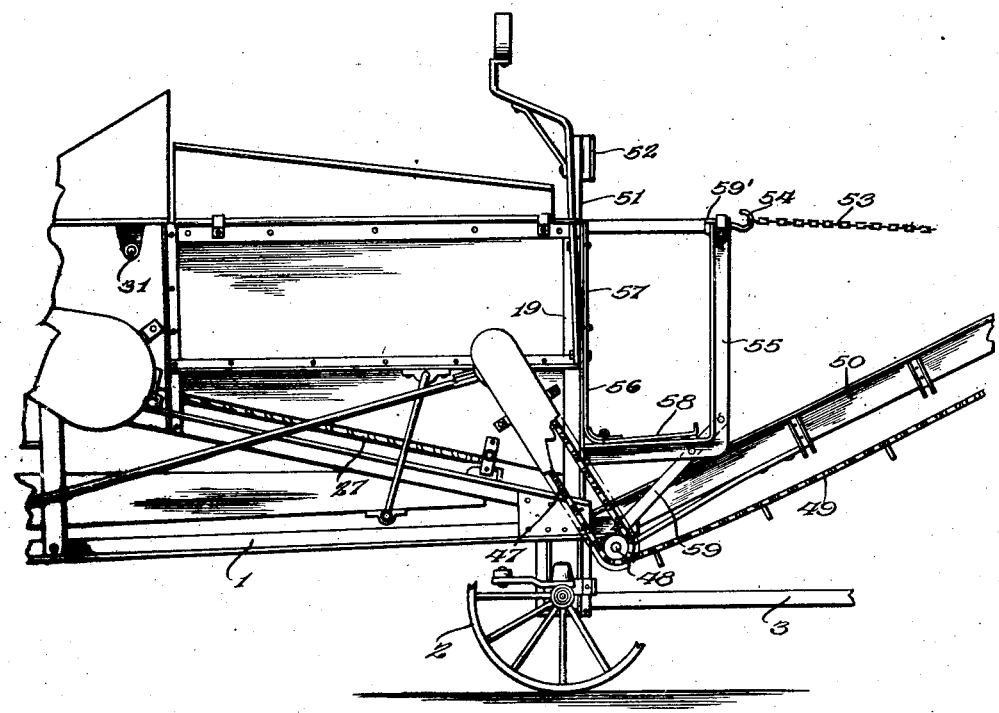
Figure 1 is a side elevation of a portion of a corn-husking machine, showing the present invention.

The front end of the machine frame 1 is supported by wheels 2, a steering pole or draft tongue 3 being secured to the front axle.

Our machine includes a feeding conveyer 30 which is mounted in the top portion of the frame and onto which are delivered the bundles of corn from which the ears of corn are to be removed and stripped of the husks. This feeding table or conveyer is driven by a shaft 31 mounted transversely in the upper part of the machine and actuated by gearing driven by the main cutter head shaft, the husking rollers, indicated at 27 being located below the feeding conveyer.

A transverse shaft 35, mounted near the front end of the machine and driven from the main shaft by gearing not shown, is connected by gearing 47 with the shaft 48 which actuates the ear conveyer 49 so that the husked ears of corn may be carried from the machine and delivered into any desired receptacle.

The ear conveyer belt 49 travels through a trough 50 which is supported at its lower end for rocking movement upon the shaft 48 and is constructed in two sections, hingedly connected, as clearly shown in Fig. 2. The conveyer may thus be folded backwardly so as to extend partly over the machine when the machine is to be shipped or stored, and to support the free end of the conveyer in its folded or collapsed condition, we provide a support consisting of a post 51 which is shown secured upon the top of the machine at the front end thereof and carries a cross bar or plate 52 at its upper end of sufficient width to provide a firm rest for the end of the conveyer, as shown in Fig. 2. To support the conveyer in its operative position, we provide chains 53 which are engaged around or with the trough in any convenient manner and are also engaged over hooks 54 at the upper ends of supporting arms 55 which are secured to the front end of the machine. These supporting arms 55, as clearly shown in Figs. 1 and 2, have lower branches which are riveted or bolted to the frame bars 19 and extend outwardly and forwardly therefrom and vertical branches which rise substantially to the top of the machine. Sheet steel plates, indicated at 56, are secured across the front end of the machine immediately above the lower branches of the brackets or arms 55, and these plates not only serve as closures for the end of the machine but also constitute braces to prevent lateral spreading. Immediately above the plates 56, similar plates 57 are hingedly secured at their upper ends to the top of the machine, these swinging plates being normally in their pendent closed positions but being capable of being swung upwardly to permit access to the interior of the machine when repairs or adjustments are needed. A platform 58 rests normally upon the lower horizontal branches of the supporting arms 55, and diagonal braces 55' extending between the same, and is hinged to the plate 56. The operator feeding the corn to the interior of the machine may stand upon this platform 58 and will be in position to guide the bundles onto the feeding conveyer 30, while at the same time he will be at sufficient distance from the snapping and husking rolls to avoid injury. When the ear conveyer is in its lower operative position, it will be clear of the free edge of this platform, but when it is swung upwardly, it will come into contact with the free edge of the platform and will swing the same upwardly, as shown in Fig. 2. To reinforce the platform and guard against collapse of the structure while an operator is standing thereon, we provide the braces 59 which are secured to the front ends of the lower side bars of the main frame and extend upwardly and forwardly therefrom to the supporting arms 55 where they are rigidly secured, extending across the bends in the arms and serving as gusset plates to brace the arms and aid in resisting the pulling strain imposed thereon by the ear conveyer. A cross bar 59' is secured to and extends between the upper ends of the arms 55 to prevent lateral spreading thereof and to provide a rest for the operator during the intervals when there are no bundles of corn at hand to be fed into the machine. A small seat may be hung on this cross bar, if desired.

The side table or board onto which the bundles are delivered as they fall in passing to the feeding conveyer 30, is shown at 60. It may be arranged at either side of the machine as may be preferred, and it is held in place by having slots which are provided near its inner edge engaged over brackets 62 provided therefor upon the main frame, and at the upper ends of the supporting arms 55. It will be noted that this side board is of such extent and so disposed that an operator standing upon the platform 58 can easily reach and handle the bundles which are deposited on the side board. At the same time, the platform 58 may be easily reached by the operator when he is to start work and it is not necessary for him to climb over or under projecting barriers as is the case in most previous machines now known to us. Bracing rods or props 65 may be provided on the side of the machine to support the outer edge portion of the side board. These props have their lower ends engaged in suitable openings or sockets provided therefor in the frame bars and in the supporting arms 55, respectively, while their upper ends will be engaged in or against suitable holding members provided on the under side of the side board.

Having thus described the invention, we claim:

1. In a corn-husking machine, the combination of a frame, an ear conveyer mounted for rocking movement in a vertical plane at the front end of the frame, platform-supporting arms secured to the front end of the frame and projecting forwardly therefrom beyond the lower end of the conveyer and then upwardly, and flexible conveyer-supporting members attached to the upwardly extending portions of said arms and engaged with the conveyer, the conveyer passing between said arms when in raised position.

2. In a corn-husking machine, the combination of a frame, a feeding conveyer mounted in the upper portion of the frame, an ear conveyer mounted on the front end of the frame for rocking movement in a vertical plane, means for supporting said conveyer in extended position, means upon the top of the frame for supporting said conveyer above the frame, supporting arms secured to the frame and projecting forwardly therefrom and then upwardly, and a swinging platform resting upon said arms over the conveyer and adapted to be raised by the conveyer when the conveyer is adjusted over the frame.

3. In a corn-husking machine, the combination with the machine frame, of an ear conveyer hinged at its lower end to the front end of the frame and constructed to extend outwardly from the frame in operative position or fold rearwardly over the frame in inoperative position, platform-carrying arms secured to the frame above the lower end of the conveyer and projecting outwardly therefrom and then upwardly, means extending from the upper ends of said arms for supporting the conveyer in operative position, braces extending upwardly and outwardly from the machine frame to said supporting arms and a post on top of the frame at the front thereof and provided with a cross bar at its upper end to support the conveyer in inoperative position.

In testimony whereof we affix our signatures.

THEODORE H. OPPENHEIM. [L. S.]
BERNARD SELHORST. [L. S.]